United States Patent [19]

Starz et al.

[11] Patent Number: 4,962,066
[45] Date of Patent: Oct. 9, 1990

[54] SOLDER PASTE FOR FASTENING SEMICONDUCTORS ONTO CERAMIC BASES

[75] Inventors: Karl-Anton Starz, Rodenbach; Mathias Metzner, Kleinostheim; Wolfgang Weber, Karlstein, all of Fed. Rep. of Germany

[73] Assignee: Degussa Aktiengesellschaft, Frankfurt am Main, Fed. Rep. of Germany

[21] Appl. No.: 483,219

[22] Filed: Feb. 21, 1990

[30] Foreign Application Priority Data

Feb. 21, 1989 [DE] Fed. Rep. of Germany ....... 3905276

[51] Int. Cl.$^5$ ................................................ C03C 8/18
[52] U.S. Cl. ..................................... 501/19; 106/1.14; 106/1.19; 106/1.23; 501/11; 501/22; 501/64; 252/514
[58] Field of Search ................. 501/11, 19, 15, 22, 501/17, 64; 106/1.14, 1.19

[56] References Cited

U.S. PATENT DOCUMENTS

| | | |
|---|---|---|
| 3,876,433 | 4/1975 | Short .................................... 106/1 |
| 4,186,023 | 1/1980 | Dumesnil et al. ..................... 106/53 |
| 4,251,595 | 2/1981 | Dumesnil et al. .................... 428/426 |
| 4,369,063 | 1/1983 | McGowan, Jr. ................... 106/1.14 |
| 4,401,767 | 8/1983 | Dietz et al. ........................... 501/19 |
| 4,636,254 | 1/1987 | Husson, Jr. et al. ............... 106/1.14 |
| 4,699,888 | 10/1987 | Dumesnil et al. ..................... 501/19 |
| 4,743,302 | 5/1988 | Dumesnil et al. ................. 106/1.23 |
| 4,761,224 | 8/1988 | Husson, Jr. et al. ............... 106/1.14 |
| 4,881,974 | 11/1989 | Herrington ........................ 106/1.14 |
| 4,904,415 | 2/1990 | Lau et al. ............................ 252/514 |

Primary Examiner—William R. Dixon, Jr.
Assistant Examiner—M. Marcheschi
Attorney, Agent, or Firm—Cushman, Darby & Cushman

[57] ABSTRACT

A solder paste for fastening semiconductors onto ceramic bases in a temperature range below 380° C., consisting essentially of (1) 75 to 90% by weight of a mixture of silver powder and a low-melting glass powder with the weight ratio of silver to glass being between 2:1 and 9:1 and (2) 10 to 25% by weight of an organic solvent which contains 1 to 10% by weight of a thermally readily decomposable resin, the glass powder consisting essentially of 75 to 85% by weight lead oxide, 8 to 15% by weight boron oxide, 0.5 to 10% by weight silver (I) oxide 0.5 to 10% by weight bismuth (III) oxide, 0 to 5% by weight silicon dioxide, 0 to 2% by weight aluminum oxide 0 to 2% by weight tin oxide, 0 to 2% by weight zinc oxide, the glass powder having a glass transition temperature (Tg) of 250° to 300° C.

3 Claims, No Drawings

SOLDER PASTE FOR FASTENING SEMICONDUCTORS ONTO CERAMIC BASES

The present invention relates to a solder paste for fastening semiconductors onto ceramic bases in a temperature range below 400° C., consisting of 75 to 90% by weight of a mixture of silver powder and a low-melting glass powder with the weight ratio of silver to glass being between 2:1 and 9:1 and consisting of 10 to 25% by weight of an organic solvent which contains 1 to 10% by weight of a thermally readily decomposable resin.

BACKGROUND OF THE INVENTION

In the hermetic enclosure of silicon semiconductors, the semiconductors are connected in many instances to ceramic bases which can also be metallized, e.g. silver-plated or gold-plated.

Recently, silver-filled glass solder pastes have been used for this purpose. These pastes consist of finely distributed silver powder and glass powder, mixed with a solvent and a thermally decomposable resin. These pastes are applied onto the ceramic bases in a thin layer, the semiconductor is put on, and the structure is dried at approximately 100° C. and heated to temperatures above 400° C. During this time solvent and resin escape, the glass softens and produces, together with the silver powder, a firmly adhering bond between the base and the semiconductor.

Silver-filled glass solders are used today especially in the manufacture of CERDIP components (CERDIP=ceramic dual inline package) and have largely replaced the previously-conventional connection technology which employed a gold/silicon solder (AuSi 2-solder).

However, the trend in electronic manufacturing is toward larger and larger, more and more complex and more and more highly integrated semiconductor components, which are very temperature-sensitive and do not withstand the burning temperatures of 400°–450° C. which were necessary in the bonding process which employed silver-filled glass solders. Diffusion processes occurring on the semiconductor are accelerated at these temperatures, and these processes can destroy the fine, metallic conducting tracks.

U.S. Pat. No. 4,401,757 discloses a metallizing paste for fastening silicon semiconductors onto ceramic bases which consists of 75–85% by weight of a mixture of 20 to 95% by weight finely distributed silver, 5–80% by weight of a low-melting glass powder and 15 to 25% by weight of an organic solvent. The glass used has a softening point between 325° and 435° C. and consists essentially of 95 to 96% by weight lead oxide, 0.25 to 2.5% by weight silicon dioxide, remainder boron oxide. It thus comes from the class of lead borosilicates. The bonding between the silicon semiconductor and the ceramic base takes place at burning temperatures between 425° C. and 525° C., especially at 430° C. Holding times of 5 to 10 minutes are necessary for achieving a good adhesive strength with this material.

U.S. Pat. No. 4,636,254 describes a silver glass paste which contains a lead borate frit and, selectively, silver oxide powder, in addition to a special silver powder mixture. In this case, the connection of the semiconductor to the ceramics also takes place preferably at 430° C. The silver oxide powder is added directly to the paste and serves to improve the burning of the organic paste constituents.

The solder pastes disclosed in U.S. Pat. Nos. 4,401,767 and 4,636,254 are disadvantageous because of the high working temperatures of approximately 430° C. as well as the long heating times of 5 to 10 minutes which are necessary for processing. These high temperatures and long heating times damage both the semiconductor and the housing materials. They can cause thermal stresses and fissures in the semiconductor material as well as initiate diffusion processes in the metallic conducting tracks which result in the destruction of the component. Such diffusion processes can occur especially in the case of semiconductors with a very fine line structure ("sub-micron-technology"), so that protective conditions for burning in are absolutely necessary. The high working temperatures of approximately 430° C. cause considerable diffusion of nickel from the nickel/gold layers of the ceramics in semiconductor housings, especially in the case of so-called multilayer housings with a high connection number (sidebraze packages, leadless ceramic chip carriers and pin grid arrays). This results in increased defects in the subsequent hermetic sealing by means of gold/tin solder.

U.S. Pat. No. 4,699,888 describes a silver glass paste suitable for lower burning temperatures around 380° C. This solder paste contains a special lead borosilicate glass with additives of $Cu_2$ and fluoride in addition to silver powder and binding agent. This does achieve a lowering of the glass melting point and the burning-in temperature of the solder paste. However, this solder paste is disadvantageous because of its fluoride content; moreover, the burning temperature of 380° C. is still too high for use with modern, highly integrated semiconductors.

SUMMARY OF THE INVENTION

The object of the present invention is to provide a solder paste for fastening semiconductors onto ceramic bases in a temperature range below 380° C. These and other objects are achieved in a solder paste consisting essentially of (1) 75 to 90% by weight of a mixture of silver powder and a low-melting glass powder with the weight ratio of silver to glass being between 2:1 and 9:1 and (2) 10 to 25% by weight of an organic solvent which contains 1 to 10% by weight of a thermally readily decomposable resin. This solder paste makes it possible to achieve a working temperature (burning temperature) of 380° C. and lower without using fluorides.

The composition of the glass powder preferably is 75 to 85% by weight lead oxide (PbO)
8 to 15% by weight boron oxide ($B_2O_3$)
0.5 to 10% by weight silver (I)-oxide ($Ag_2O$)
0.5 to 10% by weight bismuth (III) oxide ($Bi_2O_3$)
0 to 5% by weight silicon dioxide ($SiO_2$)
0 to 2% by weight aluminum oxide ($Al_2O_3$)
0 to 2% by weight tin dioxide ($SnO_2$)
0 to 2% by weight zinc oxide (ZnO)

and a glass transition temperature (Tg) of 250° to 300° C. Preferably, the solder paste consists solely of the foregoing components.

This low-melting lead borate glass, with an addition of silver oxide and bismuth oxide, exhibits very good adhesive properties at burning-in temperatures of 365° to 380° C.

The silver powder can be in the form of spherical or platelet-shaped particles or mixtures thereof. It advantageously exhibits a specific surface of 0.3 to 1.3 $m^2/g$ and a tap density between 3.0 and 5.0 $g/cm^3$.

The glass component represents the key component for achieving the desired burning temperature range and the achievable adhesive strengths of the solder pastes. It was found that the combined addition of bismuth oxide and silver oxide to a lead borate glass significantly lowers the melting temperatures of this glass. At the same time, the wetting properties to silicon and ceramic material are improved. The glass transition temperatures (Tg) of these glass types are preferably in a range of 250° C. to 300° C.

The glasses are melted according to conventional methods in crucibles, the melt is poured off via steel rollers, and the resulting glass platelets are processed in ball mills to a fine powder. The fineness of the glass powders used is under 45 μm, the tap densities 2.5 to 5 g/cm$^3$.

In addition to the components lead oxide, boron oxide, silver oxide and bismuth oxide, the glasses can also contain silicon dioxide, aluminum oxide, tin dioxide and zinc oxide. However, these additives do not constitute essential constituents of the glass.

The organic solvent has an important influence on the drying properties of the solder paste. If its boiling point is too high and its volatility is too low, very long drying times are required to achieve a connection between semiconductor and substrate which is free from cavities. If it is too readily volatile and its boiling point is too low, problems can arise during the production and processing because of a drying-up of the paste. Aromatic hydrocarbons meet the necessary requirements well for the solder pastes of the invention. The boiling range of these solvents is between 140° C. and 280° C. and the evaporation number (VZ) is between $VZ = 100$–$5000$. These aromatic hydrocarbons can also contain admixtures of higher-boiling alcohols and esters.

In order to increase the viscosity, the solvent system is compounded with an organic, thermally readily depolymerizable resin. Polyacrylates, ethyl celluloses and nitrocellulose resins have proven to be the best as organic resins.

DETAILED DESCRIPTION OF PREFERRED EMBODIMENTS

The following examples are intended to illustrate in more detail the solder pastes of the invention and their use:

1. 850 g red lead ($Pb_3O_4$), 195 g boric acid ($B(OH)_3$), 30 g silver-(II)-oxide and 30 g bismuth oxide ($Bi_2O_3$) are intimately mixed and melted in a platinum crucible at 1100° C. for 30 minutes to a glass. After the melt is poured off, glass platelets are obtained which are ground in a ceramic mill to a fine powder. The composition of the glass is 83% PbO, 11% $B_2O_3$, 3% $Ag_2O$ and 3% $Bi_2O_3$. The glass powder is sieved out to a grain size of less than 45 μm. In order to determine the flow properties and wetting properties of the glass, the so-called "button-flow test" is performed. Approximately 3 g of the glass powder is pressed to form a tablet, this tablet is placed onto a ceramic substrate, heated to 400° C. for 10 minutes and the diameter of the molten glass specimen is subsequently measured. The diameter of the specimen of this glass is d=2.06 cm and demonstrates thereby the high fluidity and the good wetting properties of the glass. The glass transition temperature $T_g$ (measured with the DSC method) is $T_g = 287°$ C.

17 g of this glass powder are compounded with 68 g fine silver powder (platelet-shaped, tap density 4 g/cm$^3$) and with 15 g of a resin solution consisting of 90% solvent naphtha and 10% acrylic resin (Degalan LP 62/05 —produced by Degussa AG) and processed to a solder paste. The solid content of this paste is 85%, the ratio of silver/glass=80:20.

Silicon chips with a size of 7.5×7.5 mm (=300×300 mil) are fastened with this paste to ceramic substrates (92% $Al_2O_3$).

The paste is applied to the ceramic substrate with a metering sprayer and the semiconductor is carefully pressed into the paste.

The assembly is subsequently dried for 1 hour at 100° C. Then a low-temperature burning-in process takes place in a continuous strip furnace in which the semiconductors are exposed to a peak temperature of 370° C. for 20 minutes. After the burning in, the semiconductors exhibit a very good adhesive strength on the ceramic base.

The values of the adhesive strength, measured in the so-called "die shear test" (MIL STD 883, method 2019.2) are approximately 50 kg and therefore far above the value required in the MIL STD 883 norm.

2. For comparison, a lead borate glass with the composition $PbO \times B_2O_3$ (88% by weight PbO, 12% by weight $B_2O_3$) disclosed in U.S. Pat. No. 4,636,254 was used as glass component. It represents the lowest-melting eutectic of the lead oxide—boron oxide system.

The preparation of the solder paste with this glass takes place in the same manner as was described in Example 1. Silicon chips with a size of 7.5×7.5 mm are again fastened with this paste onto ceramic substrates (92% $Al_2O_3$) and exposed after the drying at 100° C. for 1 hour to the low-temperature burning process at 370° C. for 20 minutes.

After the burning in, the semiconductors exhibit an adhesive strength of only approximately 10 kg on the ceramic base ("die shear test" according to MIL STD 883, method 2019.2). This value is distinctly below the value of the solder paste described in Example 1.

3. 839.5 g red lead ($Pb_3O_4$), 195 g boric acid ($B(OH)_3$), 60 g silver-(I)-oxide and 10 g bismuth oxide ($Bi_2O_3$) are intimately mixed and melted in a platinum crucible at 1100° C. for 30 minutes to a glass. After the melt has been poured off, glass platelets are obtained which are ground in a ceramic mill to a fine powder. The composition of the glass after manufacture is 82% PbO, 11% $B_2O_3$, 6% $Ag_2O$ and 1% $Bi_2O_3$.

The glass powder is sieved out to a grain size of less than 45 microns. The "button flow test", carried out as described in Example 1, yields a diameter of d=2.08 cm for this glass. The glass transition temperature Tg (measured with the DSC method) is 278° C. The preparation of the solder paste with this glass takes place in the same manner as was described in Example 1.

Silicon chips with a size of 7.5×7.5 mm (chip back side: bright silicon) are fastened with this paste onto ceramic substrates (92% $Al_2O_3$) and exposed after the drying at 100° C. for 1 hour to the low-temperature process at 370° C. for 20 minutes.

After the burning-in, the assembly has an adhesive strength of about 58 kg in the shear test. This value is well above the value required by MIL STD 883.

What is claimed is:

1. A solder paste for fastening semiconductors onto ceramic bases at a temperature below 380° C., consisting essentially of (1) 75 to 90% by weight of a mixture of silver powder and (2) a low-melting glass powder with the weight ratio of silver to glass being between 2:1 and 9:1 and (2) 10 to 25% by weight of an organic solvent which contains 1 to 10% by weight of a thermally readily decomposable resin, the glass powder consisting essentially of

- 75 to 85% by weight lead oxide
- 8 to 15% by weight boron oxide
- 0.5 to 10% by weight silver (I) oxide
- 0.5 to 10% by weight bismuth (III oxide
- 0 to 5% by weight silicon dioxide
- 0 to 2% by weight aluminum oxide
- 0 to 2% by weight tin dioxide
- 0 to 2% by weight zinc oxide and having a glass transition temperature (Tg) of 250° to 300° C.

2. A solder paste as set forth in claim 1 in which the thermally readily decomposable resin is a polyacrylate resin.

3. A solder paste according to claim 1 or 2 in which the organic solvent is a high-boiling hydrocarbon.

* * * * *